United States Patent
Hijishiri

[19]

[11] Patent Number: 5,953,038
[45] Date of Patent: Sep. 14, 1999

[54] MULTILEVEL IMAGE RECORDING METHOD

[75] Inventor: Hideaki Hijishiri, Saitama-ken, Japan

[73] Assignee: Fuji Photo Film Co., Ltd., Kanagawa, Japan

[21] Appl. No.: 08/811,965

[22] Filed: Mar. 5, 1997

[30] Foreign Application Priority Data

Mar. 6, 1996 [JP] Japan ..................................... 8-048952

[51] Int. Cl.$^6$ ........................................................ B41J 2/52
[52] U.S. Cl. ............................ 347/183; 347/190; 358/298
[58] Field of Search ............................... 347/183, 40, 190, 347/195; 358/298

[56] References Cited

U.S. PATENT DOCUMENTS 5,432,611  7/1995  Haneda et al. ........................... 358/298

Primary Examiner—N. Le
Assistant Examiner—Shih-Wen Hsieh
Attorney, Agent, or Firm—Sughrue, Mion, Zinn, Macpeak & Seas, PLLC

[57] ABSTRACT

A multilevel image recording method is provided which can reproduce high resolution images with high quality and at a linear gradation. One pixel is formed by a left dot and a right dot, and a density of the pixel is expressed by a sum total of surface areas of each dot. The density of the pixel is distributed to the left dot and the right dot in accordance with curve A or curve B. At least dots expressing maximum densities at respective pixels in halftone regions are right dots.

10 Claims, 2 Drawing Sheets

MULTILEVEL IMAGE RECORDING METHOD

BACKGROUND OF THE INVENTION

1. Field of the Invention

The present invention relates to a multilevel image recording method for recording multilevel images by changing the recorded surface areas of a plurality of dots forming one pixel.

2. Description of the Related Art

A multilevel image recording method is known in which the density of one pixel is expressed by recorded surface areas of a plurality of dots by using thermal heads, in which a plurality of heat-generating elements are aligned in a direction (the main scanning direction) orthogonal to the direction (subscanning direction) in which the recording paper is conveyed, as a means for heat-sensitizing/recording a multilevel image.

In this method, the density of one pixel is expressed by distributing the density of the pixel into a plurality of dots forming the pixel. The density of the pixel is expressed by the total sum of the densities of the respective dots.

In accordance with the above-described method, the plurality of dots each express a gradation. Therefore, as compared with a case in which the density of one pixel is expressed by one dot, the number of gradations which can be expressed is increased and the density can be expressed linearly. An example of a combination of plural dots forming one pixel is two dots which are adjacent in the main scanning direction.

Recently, there has been a demand for expression of images of a higher number of gradations (high resolution images). When images of a higher number of gradations are expressed by using the above-described method, in order to increase the number of gradations which can be expressed, the number of dots forming one pixel may be increased. However, because the gradation of the image depends on the dot pitch, when images of a high number of gradations are to be expressed, the heat-generating bodies of the thermal heads must be disposed at a narrow pitch.

The coloring density of the recording paper depends on the energy supplied to the recording paper from the thermal heads. The recording paper is colored when the energy supplied from the thermal heads exceeds a coloring threshold value of the recording paper.

Usually, when an image of about 256 gradations is recorded at a low resolution of about 400 dpi, the pitch of the heat-generating bodies of the thermal heads is sufficiently ensured as compared with the number of gradations. As a result, even when a shadow region, in which the pixels have large recording surface areas, is recorded, because the space between adjacent pixels is sufficiently ensured, adjacent pixels do not contact one another.

However, when an image is recorded at a high resolution of about 600 dpi, the pitch of the heat-generating bodies is narrow as compared to the number of gradations, and the space between adjacent pixels is narrow. As a result, adjacent pixels may contact one another in shadow regions, in which the recorded surface areas of the pixels are large, and even in highlight regions in which the recorded surface areas of the pixels are small.

Conventionally, densities which are distributed to a plurality of dots forming one pixel are set per pixel. As a result, for an image which is to be reproduced, the relationship of the lightness and darkness of the density of each dot forming one pixel differs per pixel.

FIG. 3 is a partially expanded view of an image reproduced by a conventional means, and illustrates a case in which the image is reproduced by using two dots for one pixel. The density of two dots forming one pixel is illustrated by surface area gradation in FIG. 3. However, in the encircled region in FIG. 3, the relationship of lightness and darkness of the densities of two dots forming one pixel is opposite that of other regions.

When the relationship of lightness and darkness of the densities is opposite, the directions of pixels P become non-uniform, and adjacent pixels contact each other such that the space between adjacent pixels is eliminated. If the directions of the pixels P become non-uniform, the image gives off the impression (feeling) of roughness. Further, if the space between adjacent pixels is eliminated, jumps in gradation become marked particularly in highlight regions, and accordingly, a linear gradation characteristic cannot be obtained.

SUMMARY OF THE INVENTION

An object of the present invention is to solve the above described drawbacks by providing a multilevel image recording method in which a high resolution image can be reproduced with high quality and at a linear gradation.

In the multilevel image recording method relating to the present invention, one pixel is formed by a plurality of dots and a density of the pixel is expressed by a sum total of surface areas of the respective dots, and the density of one pixel is distributed to the respective dots at ratios which are set in advance and which correspond to respective dot densities, and dots expressing the greatest densities are always the same at each pixel in at least a halftone region.

Further, at each pixel in a highlight region, the distribution ratios of specific dots are set greater than the distribution ratios of specific dots in the halftone region and the shadow region.

Moreover, the minimum dot pitch is set to less than or equal to 50 $\mu$m.

Note that in the present application, the term "halftone" refers to regions of about 50% density, "highlight regions" refers to regions of about 20% or less, and "shadow regions" refers to regions of about 80% or more density".

DESCRIPTION OF THE PREFERRED EMBODIMENT

An embodiment of the present invention will be described hereinafter with reference to the drawings.

Figure 1:
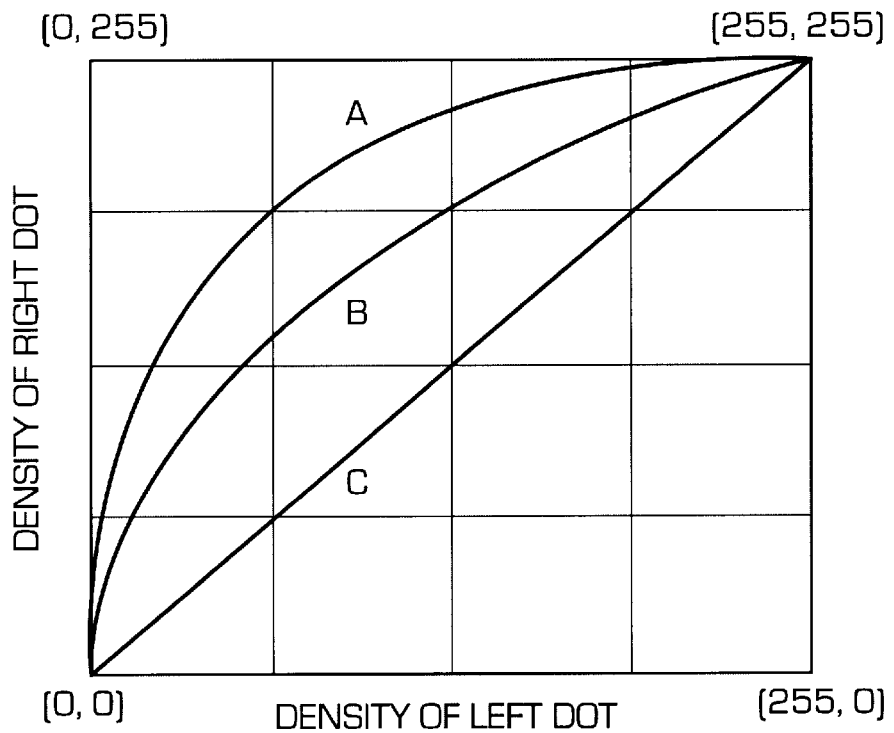
FIG. 1 is a view illustrating a density distribution characteristic for distributing a density of one pixel to left and right dots.

FIG. 1 illustrates a density distribution characteristic for distributing the density of one pixel to two dots (a left dot and a right dot). The vertical axis and the horizontal axis represent the densities of the right dot and the left dot, respectively. The density value of each dot is expressed by a value from 0 to 255. The density of one pixel is the sum total of the density values of the respective dots and is expressed by a value from 0 to 510.

Curve A and curve B in FIG. 1 are density distribution curves relating to the present invention. A highlight region in which the density value is low is the origin, and a shadow region in which the density value is high is the end point.

In accordance with curve A and curve B, when the gradation image of one pixel is reproduced, the density distribution ratio of the right dot versus the left dot is great. Further, at curve A, the distribution ratios of the right dots versus the left dot are greater than those at curve B. In contrast, in accordance with straight line C, when the density of one pixel is reproduced, the density values of the right dot and the left dot are equal.

Accordingly, by reproducing the density of one pixel in accordance with a curve in the region to the upper left of the straight line C, the distribution ratio of the right dot versus the left dot is always great. Conversely, by reproducing the density of one pixel in accordance with a curve in the region to the lower right of the straight line C, the distribution ratio of the left dot versus the right dot is great.

The following Tables 1 through 3 list density values of left and right dots of curves A and B for a highlight region, a halftone region, and a shadow region, respectively.

TABLE 1

HIGHLIGHT REGION

| Total Density | A | | B | |
|---|---|---|---|---|
| | Density of Left Dot | Density of Right Dot | Density of Left Dot | Density of Right Dot |
| 10 | 0 | 10 | 0 | 10 |
| 11 | 0 | 11 | 0 | 11 |
| 12 | 0 | 12 | 0 | 12 |
| 13 | 0 | 13 | 1 | 12 |
| 14 | 0 | 14 | 1 | 13 |

TABLE 2

HALFTONE REGION

| Total Density | A | | B | |
|---|---|---|---|---|
| | Density of Left Dot | Density of Right Dot | Density of Left Dot | Density of Right Dot |
| 268 | 70 | 198 | 97 | 171 |
| 269 | 70 | 199 | 97 | 172 |
| 270 | 71 | 199 | 98 | 172 |
| 271 | 72 | 199 | 98 | 173 |
| 272 | 72 | 200 | 99 | 173 |

TABLE 3

SHADOW REGION

| Total Density | A | | B | |
|---|---|---|---|---|
| | Density of Left Dot | Density of Right Dot | Density of Left Dot | Density of Right Dot |
| 468 | 214 | 254 | 224 | 244 |
| 469 | 215 | 254 | 224 | 245 |
| 470 | 216 | 254 | 225 | 245 |
| 471 | 217 | 254 | 226 | 245 |
| 472 | 218 | 254 | 227 | 245 |

As illustrated in FIG. 1 and in Tables 1 through 3, in curve A, the gradation value of the right dot preferentially reaches about 255, and then the gradation value of the left dot is increased to 255, so that the total sum of the gradation values of the left and right dots is 510, the maximum gradation value of a pixel.

With regard to curve B, the distribution ratios of the right dots versus the left dots are less than those of curve A. At curve B, the total sum of the gradation values of the left and right dots reaches 510 which is the maximum gradation value of a pixel.

Figure 2:
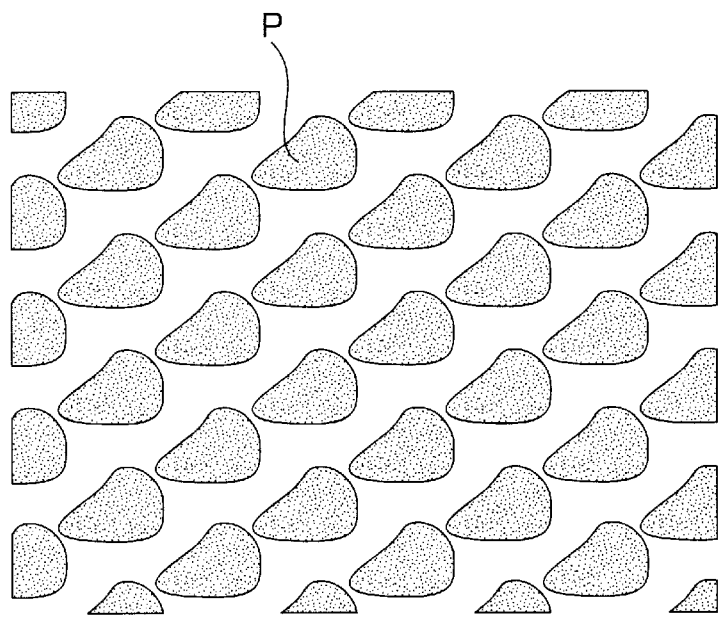
FIG. 2 is a partially expanded view illustrating a halftone region of an image reproduced in accordance with curve A illustrated in FIG. 1.

FIG. 2 is a partially expanded view of a halftone region of an image obtained by distributing the density of each pixel to a left dot and a right dot. As illustrated in FIG. 2, by reproducing the image of the pixel by making the density distribution ratio of the right dot versus the left dot great, the surface area of the right dot is always larger, and therefore, the directions of the pixels P are uniform. In other words, the pixels appear to face in the same general direction.

Further, by making the density distribution ratios of the right dots versus the left dots greater, the right dots which have large surface areas and the left dots which have small surface areas are disposed adjacent to one another at portions at which pixels are adjacent to one another. As a result, it becomes difficult for the space between adjacent pixels to be eliminated, and accordingly, a linear gradation is reproduced.

Figure 3:
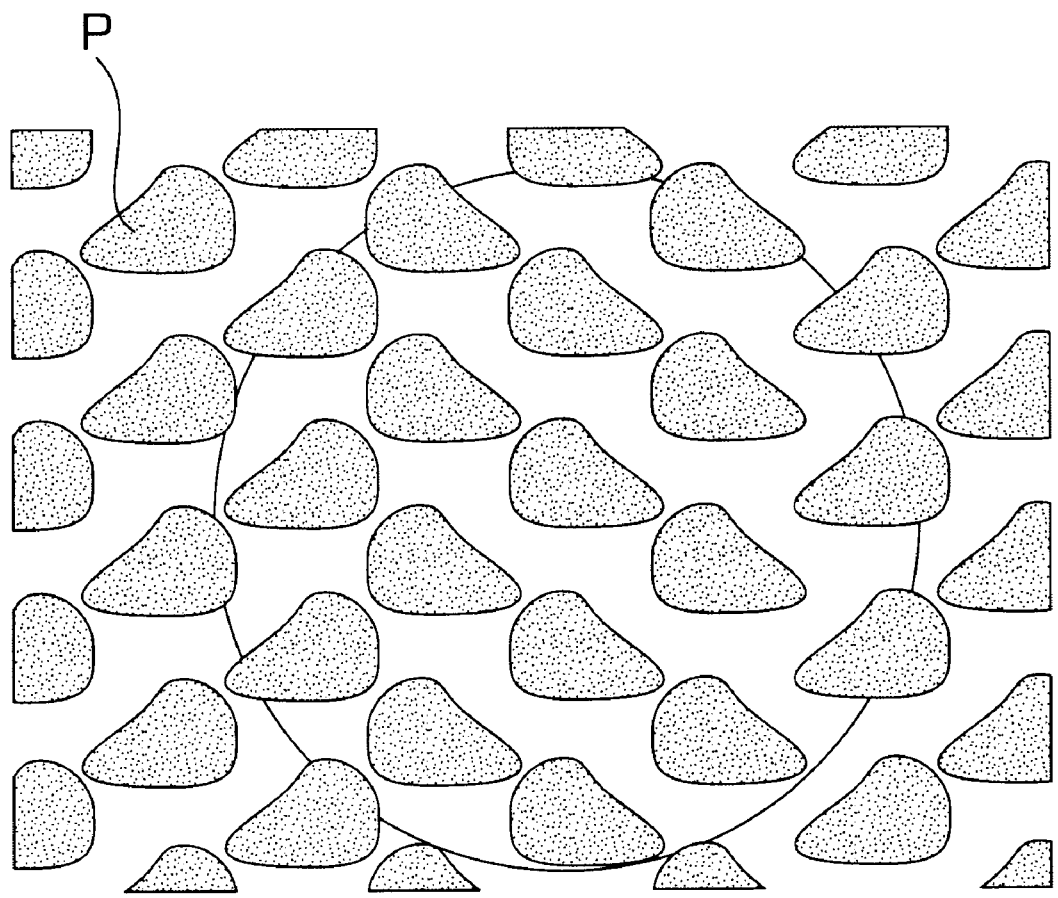
FIG. 3 is a partially expanded view illustrating a halftone region of an image reproduced by a conventional means.

Conventionally, the density of one pixel has been distributed to left and right dots by using all of the coordinates in the region to the upper left of and in the region to the lower right of the straight line C in the graph of FIG. 1. Therefore, the relationship of the magnitudes of the densities of the left and right dots is not uniform, and the directions of the pixels P are not uniform as illustrated in FIG. 3. In other words, the pixels in the middle of the encircled region appear to face the opposite direction of the pixels outside the encircled region in FIG. 3.

In contrast, in the present invention, the density of one pixel is distributed to a left dot and a right dot by using only the coordinates in the region to the upper left of the straight line C in the graph. Therefore, the relationship of the magnitudes of the densities of the left and right dots is the same for all of the pixels, and the directions of the pixels P are uniform.

The above is a description of a case in which the relationship of the magnitudes of the left and right dots is the same and the directions of the pixels are uniform for all gradations. However, it suffices for the relationship of the magnitudes of the left and right dots to be the same and for the directions of the pixels to be uniform only in the halftone regions which are the most noticeable (i.e., regions having density values of 30–70%). In this way, any rough impression which would otherwise be given off in the halftone regions which are the most noticeable can be eliminated.

In particular, in highlight regions in which the space between adjacent pixels is large, the image is reproduced by the ratio of density distribution of the right dot versus the left dot being increased and the density value of the right dot being given priority. In this way, a linear gradation can be reproduced. In shadow regions, because the space between adjacent pixels is small and adjacent pixels approach one another, jumps in gradation are not as noticeable as in highlight regions. Accordingly, by avoiding jumps in gradation in highlight regions, an overall linear gradation can be reproduced.

In FIG. 1, there are a plurality of curves for distributing the density of one pixel to a left dot and a right dot for reproduction. An optimal curve is selected from among these curves in accordance with the type of the recording paper, the configurations of the thermal heads, and the like. For example, with regard to curves A and B, in a case in which the recording paper is conveyed rapidly, distributing the density of one pixel to left and right dots in accordance with curve A results in fewer density irregularities of the image than if curve B is used.

Hereinafter, the configurations of the dots will be discussed.

As described previously, the density of one pixel is expressed by a combination of a left dot and a right dot. As shown in FIG. 2, the pixels are shaped like fish scales. This configuration is due to the fact that the surface area of the right dot is greater than the surface area of the left dot.

By changing the ratio of the surface areas of the right dot and the left dot, the configuration of the pixel can be changed. For example, by lowering the density distribution ratio of the right dot versus the left dot in the fish-scale-shaped pixel of FIG. 2, the surface area of the left dot increases, and the configuration of the dot is changed from a fish-scale-shape to an oval shape.

The surface area of the dot is proportional to the amount of thermal energy supplied from the thermal heads. Accordingly, when the amount of energy is small, because the heat distribution on the recording paper is narrow, the surface area of the dot is small and circular. On the other hand, when the amount of thermal energy is great, because the heat distribution on the recording paper is wide, the surface area of the dot is large and elliptical.

The configuration of the dot depends on the distribution ratios of the left and right dots and on the amount of thermal energy supplied from the thermal heads. Accordingly, by controlling these two factors, the configurations of the dots can be changed.

In accordance with the invention described above, in a multilevel image recording method in which one pixel is formed by a plurality of dots and the density of one pixel is expressed by the sum total of the surface areas of the dots, the density of one pixel is distributed to respective dots at preset ratios corresponding to respective densities, and the dots expressing the greater densities are always made the same at each pixel. In this way, the directions of the pixels can be made uniform. Therefore, a high-quality image which does not give off a rough impression can be obtained. Further, because the directions of the pixels are uniform, the spaces between adjacent pixels are not eliminated. As a result, a linear gradation can be reproduced. In particular, because the dots which express maximum densities are the same at each pixel within a halftone region, impressions of roughness in halftone regions which are the most noticed are eliminated, and a high-quality image can be reproduced.

Further, by making the density distribution ratios of specific dots greater for each pixel in a highlight region, than in a halftone region or shadow region, a linear gradation can be reproduced in highlight regions in which the spaces between adjacent pixels are large and jumps in gradation are obvious.

Moreover, by setting the minimum dot pitch to less than or equal to 50 μm, images of high resolutions of around 600 dpi can be reproduced with high quality.

What is claimed is:

1. A multilevel image comprising:
   a plurality of pixels, each of said pixels being formed by a plurality of dots and having a pixel density;
   wherein each of said dots has a dot density and the pixel density of each of said pixels is expressed by a sum total of the dot densities in the respective plurality of dots;
   wherein the pixel density of each of said pixels is distributed among the respective plurality of dots at predetermined density ratios, to produce dots ranging in magnitude from a maximum density dot to a minimum density dot; and
   wherein the dots within each of said pixels are arranged according to a predetermined locational relationship defined by relative densities of the respective plurality of dots.

2. A multilevel image according to claim 1, wherein the plurality of pixels comprises:
   a highlight region wherein each pixel is about 20% or less a maximum pixel density;
   a halftone region wherein each pixel has a pixel density of about 30%–70% the maximum pixel density; and
   a shadow region wherein each pixel has a pixel density of about 80% or more the maximum pixel density.

3. A multilevel image according to claim 2, wherein the predetermined density ratios corresponding to the dot densities of the respective plurality of dots in pixels in the highlight region are greater than the predetermined ratios corresponding to the to the dot densities of the respective plurality of dots in pixels in the halftone region and the shadow region.

4. A multilevel image recording method according to claim 3, wherein a minimum dot pitch in the plurality of pixels is less than or equal to 50 μm.

5. A multilevel image recording method according to claim 1, wherein a minimum dot pitch in the plurality of pixels is less than or equal to 50 μm.

6. A multilevel image recording method for forming an image comprising the steps of:
   expressing each pixel in a plurality of pixels that form the image with a plurality of dots, each dot having a dot density;
   defining a pixel density of each pixel by a total sum of the dot densities in the respective plurality of dots;
   distributing the pixel density of each pixel among the respective plurality of dots at predetermined density ratios, to produce dots ranging in magnitude from a maximum density dot to a minimum density dot;
   arranging the plurality dots within each pixel according to a predetermined locational relationship defined by relative densities of the respective plurality of dots; and
   forming the image with the plurality of pixels.

7. The multilevel image recording method according to claim 6, wherein the plurality of pixels comprises:
   a highlight region wherein each pixel is about 20% or less a maximum pixel density,
   a halftone region wherein each pixel has a pixel density of about 30%–70% the maximum pixel density; and
   a shadow region wherein each pixel has a pixel density of about 80% or more the maximum pixel density.

8. The multilevel image recording method according to claim 7, wherein the predetermined density ratios corresponding to the dot densities of the respective plurality of dots in pixels in the highlight region are greater than the predetermined ratios corresponding to the to the dot densities of the respective plurality of dots in pixels in the halftone region and the shadow region.

9. The multilevel image recording method according to claim 8, wherein a minimum dot pitch in the plurality of pixels is less than or equal to 50 μm.

10. The multilevel image recording method according to claim 6, wherein a minimum dot pitch in the plurality of pixels is less than or equal to 50 μm.

* * * * *